United States Patent [19]

Damerau et al.

[11] Patent Number: 5,258,909
[45] Date of Patent: Nov. 2, 1993

US005258909A

[54] METHOD AND APPARATUS FOR "WRONG WORD" SPELLING ERROR DETECTION AND CORRECTION

[75] Inventors: Frederick J. Damerau, North Salem, N.Y.; Eric K. Mays, Ridgefield, Conn.; Robert L. Mercer, Yorktown Heights, N.Y.

[73] Assignee: International Business Machines Corporation, Armonk, N.Y.

[21] Appl. No.: 401,584

[22] Filed: Aug. 31, 1989

[51] Int. Cl.$^5$ ............................................. G06F 15/40
[52] U.S. Cl. ............................................. 364/419.22
[58] Field of Search ........................................ 364/419

Primary Examiner—Gail O. Hayes
Attorney, Agent, or Firm—Marc D. Schechter

[57] ABSTRACT

A method of detecting and correcting an error in a string of information signals. When each information signal represents a word, the method detects and corrects spelling errors. The method detects and corrects an error which is a properly spelled word, but which is the wrong (not intended) word. For example, the method is capable of detecting and correcting a misspelling of "HORSE" as "HOUSE". In the spelling error detection and correction method, a first word in an input string of words is changed to form a second word different from a first word to form a candidate string of words. The spellings of the first word and the second word are in the spelling dictionary. The probability of occurrence of the input string of words is compared to the product of the probability of occurrence of the candidate string of words multiplied by the probability of misrepresenting the candidate string of words as the input string of words. If the former is greater than or equal to the latter, no correction is made. If the former is less than the latter, the candidate string of words is selected as a spelling correction.

36 Claims, 5 Drawing Sheets

METHOD AND APPARATUS FOR "WRONG WORD" SPELLING ERROR DETECTION AND CORRECTION

BACKGROUND OF THE INVENTION

The invention relates to methods and apparatus for detecting and correcting errors in information signals. More specifically, the invention relates to the detection and correction of spelling errors.

In text processing apparatus, such as dedicated word processors or word processing programs which are run on general purpose digital computers, it is desirable to provide automatic detection and correction of spelling errors. Most spelling error detection apparatus and programs check each word in a text against the entries in a spelling dictionary. Words in the text which are not found in the spelling dictionary are assumed to be misspelled. The misspelled words are identified to the text processing operator by, for example, highlighting the word on a display device. Sometimes candidate words having spellings similar to the misspelled word are also displayed to the operator as proposed corrections.

The known apparatus and methods for detecting and correcting spelling errors have several deficiencies. Most importantly, the known apparatus and methods cannot detect a "wrong word" erroneous spelling (where the erroneous spelling is itself a word in the spelling dictionary but is not the word that was intended).

Moreover, even where the erroneous spelling does not appear in the spelling dictionary, the prior apparatus and methods provide no means or only limited means for ranking alternative candidates for the correct spelling.

SUMMARY OF THE INVENTION

It is an object of the invention to provide a method and apparatus for detecting and correcting an error in an information signal, where the information signal represents the wrong information. When the information signal represents a word, the invention provides a method and apparatus for detecting and correcting spelling errors, where erroneously spelled words are correct entries in the spelling dictionary, but are not the intended words.

It is another object of the invention to provide a method and apparatus for estimating the probability of occurrence of a word whose spelling is being checked, and to estimate the probabilities of one or more alternative words as candidates for replacing the word being checked.

In a spelling error detection and correction method according to the present invention, an input string of words $T_i = W_i$ is provided. The spelling of a first word $T_1 = W_1$ in the input string is changed to form a second word $W_2$ different from the first word, to form a candidate string of words $W_c$. The probability $P(W_i)$ of occurrence of the input string of words and the probability $P(W_c)$ of occurrence of the candidate string of words are estimated. The probability $P(T_i|W_c)$ of misrepresenting the candidate string of words $W_c$ as the input string of words $T_i$ is also estimated. Thereafter, $P(W_i)$ is compared with the product $P(W_c)P(T_i|W_c)$. A first output is produced if $P(W_i)$ is greater than $P(W_c)P(T_i|W_c)$, otherwise a second output is produced.

In one aspect of the invention, the first output comprises the input string of words. The second output, comprises the candidate string of words. Alternatively, the second output may be an error indication.

The probability $P(T_i|W_c)$ of misrepresenting the candidate string of words as the input string of words may be estimated as the probability $P(T_1|W_2)$ of misspelling the second word $W_2$ as the first word $T_1$.

In the spelling error detection and correction method and apparatus according to the invention, each word in the input string and each word in the candidate string is a member of a set of correctly spelled words.

Preferably, the method and apparatus according to the invention further comprise the step of estimating the probability $P(T_i|W_i)$ of correctly spelling all of the words in the input string of words $W_i$. In this case, the product $P(W_i)P(T_i|W_i)$ is compared with the product $P(W_c)P(T_i|W_c)$. The first output is produced if $P(W_i)P(T_i|W_i)$ is greater than $P(W_c)P(T_i|W_c)$, otherwise the second output is produced.

The probability $P(T_i|W_i)$ of correctly spelling all of the words in the input string may be estimated as the probability $P(T_1|W_1)$ of correctly spelling the first word $W_1$.

According to an embodiment of the invention, the spelling of the first word $T_1$ may be changed to form the second word $W_2$ by adding, deleting, transposing, or replacing one or more letters in the first word to form a tentative word. The tentative word is compared to each word in the set of words. The tentative word is used as the second word $W_2$ if the tentative word matches a word in the set of correctly spelled words.

Alternatively, the spelling of the first word may be changed to form a second word by identifying a confusion group of M different words in the set of correctly spelled words. Each word in the confusion group may, for example, have a spelling which differs from the first word by no more than two letters. Alternatively, each word in the confusion group may be one which is confusable with the first word. At least one word in the confusion group is selected as the second word $W_2$.

Satisfactory results have been obtained in the method and apparatus according to the invention by estimating the probability of correctly spelling a word as 0.999. The probability of misspelling a word may be estimated to be (0.001/M).

The spelling error detection and correction method and apparatus according to the present invention are advantageous because by comparing the probability of occurrence of the word being checked and the probabilities of occurrence of one or more spelling correction candidates, it is possible to detect and correct errors which are correct spellings of the wrong word.

DESCRIPTION OF THE PREFERRED EMBODIMENTS

The invention is a method of detecting and correcting an error in an information signal. In the case where each information signal represents a word which is a member of a set of correctly spelled words, the invention provides a method of spelling error detection and correction.

Figure 1:
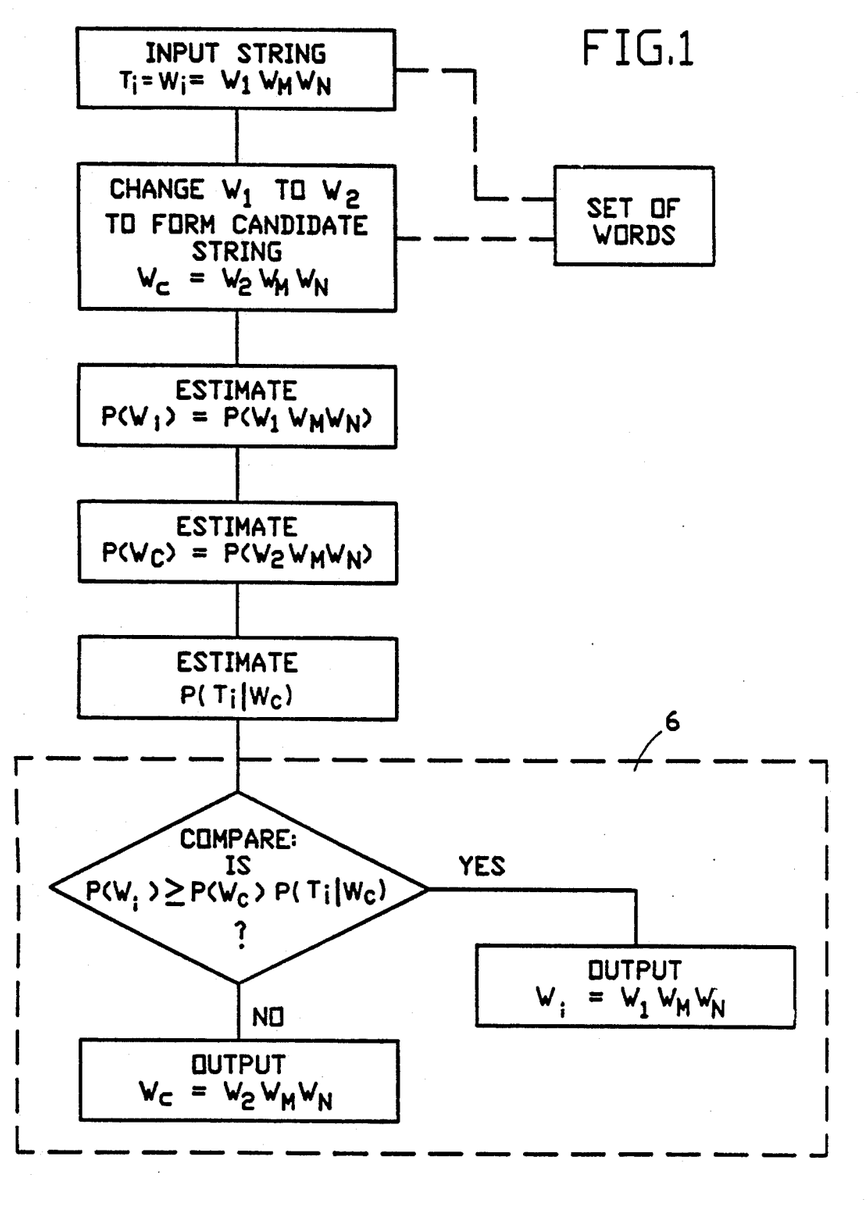
FIG. 1 is a block diagram of an embodiment of the spelling error detection and correction method according to the present invention.

Referring to FIG. 1, the spelling error detection and correction method starts with the step of providing an input string of words $T_1 = W_i$. Each word in the input string has a spelling.

Next, the spelling of a first word $T_1 = W_2$ in the input string is changed to form a second word $W_2$ different from the first word, to form a candidate string of words $W_c$.

In FIG. 1, the input string and the candidate string each comprise three words. According to the invention, the input and candidate strings may be any length greater than or equal to two. Each string may be, for example, a sentence or a phrase.

Next, the probabilities $P(W_i)$ of occurrence of the input string of words and $P(W_c)$ of occurrence of the candidate string of words are estimated. These probabilities may be estimated empirically by examining large bodies of text, as discussed in more detail, below.

Also estimated is the probability $P(T_i/W_c)$ of misrepresenting the candidate string of words $W_c$ as the input string of words $T_i$. The probability $P(T_i/W_c)$ may be chosen empirically by selecting different values until satisfactory results are obtained, as discussed in the Examples below.

After the required probabilities are estimated, the probability $P(W_i)$ is compared with the product of the probabilities $P(W_c)P(T_i/W_c)$. If $P(W_i)$ is greater than or equal to the product $P(W_c)P(T_i/W_c)$, then a first output is produced. Otherwise, a second output is produced.

As shown in FIG. 1, the first output may be the input string $W_1 W_M W_N$. The second output may be the candidate string $W_2 W_M W_N$.

Alternatively, the second output may be an error indication.

Figure 2:
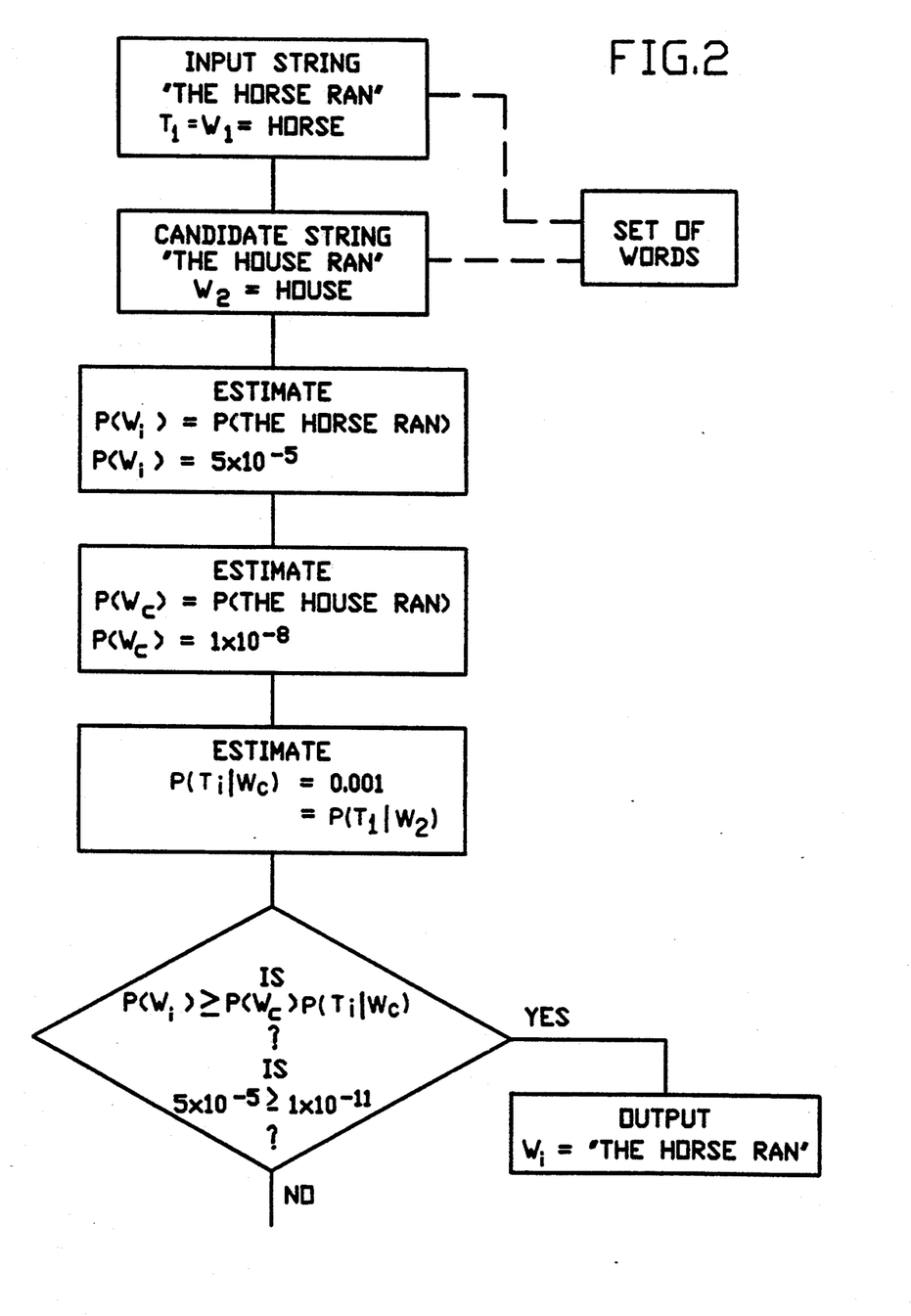
FIG. 2 is a block diagram of an example of the spelling error detection and correction method of FIG. 1.
Figure 3:
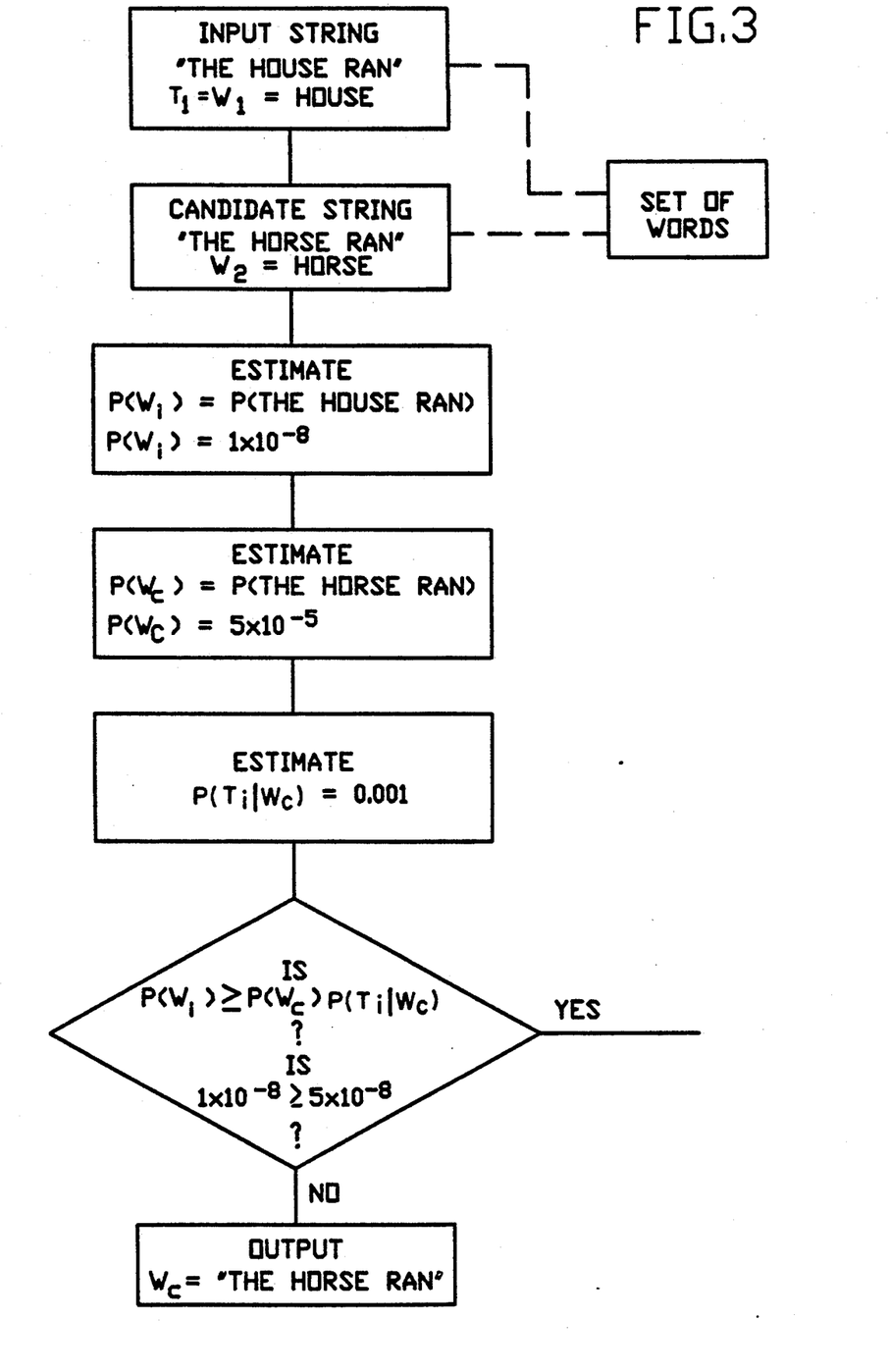
FIG. 3 is a block diagram of another example of the spelling error detection and correction method of FIG. 1.

Two examples of the spelling error detection and correction method according to the present invention are shown in FIGS. 2 and 3. Referring to FIG. 2, the input string is a string of three words: "the horse ran". Each word in the input string of words is a member of a set of correctly spelled words. The first word $T_1 = W_2$ is "horse".

Next, the spelling of the first word "horse" is changed to form the second word $W_2$, "house". The candidate string of words $W_c$ is then "the house ran". The second word "house" is also a member of the set of correctly spelled words.

Continuing, the probability $P(W_i)$ of occurrence of the input string of words "the horse ran" is estimated to be $5 \times 10^{-5}$. The probability $P(W_c)$ of occurrence of the candidate string of words "the house ran" is estimated to be $1 \times 10^{-8}$. While these probabilities are purely hypothetical for the purpose of illustrating the operation of the present invention, the hypothetical numbers illustrate that the probability of occurrence of "the horse ran" is much greater than the probability of occurrence of "the house ran".

Proceeding with the method, the probability $P(T_i/W_c)$ of misrepresenting the candidate string of words as the input string of words is estimated to be equal to the probability $P(T_1/W_2)$ of misspelling the second word $W_2$ as the first word $T_1$. From experiment it has been determined that an estimate of 0.001 produces satisfactory results.

Finally, the value of $P(W_i)$ is compared to the product $P(W_c)P(T_i/W_c)$. Since the former ($5 \times 10^{-5}$) is greater than the latter ($1 \times 10^{-11}$), the input string of words is determined to be correct, and the candidate string of words is rejected. Accordingly, the output is "the horse ran".

FIG. 3 illustrates the operation of the spelling error detection and correction method where the input string is "the house ran". Now the first word $T_1 = W_2$ is "house", and the second word $W_2$ is "horse". By using the same probabilities estimated in FIG. 2, the probability of the input string ($1 \times 10^{-8}$) is now less than the product of the probability of the candidate string multiplied by the probability of misrepresenting the candidate string as the input string ($5 \times 10^{-8}$). Therefore, the input string is now rejected, and the candidate string is determined to be correct. The output is set to "the horse ran".

The spelling error detection and correction method according to the present invention is based on the following theory. For each candidate string of words (for example, for each candidate sentence) $W_c$, the probability that the candidate sentence was actually intended given that the original sentence (input string of words) $T_i = W_i$ was typed is given by $$P(W_c|T_i) = \frac{P(W_c)P(T_i|W_c)}{P(T_i)}. \quad (1)$$

In this equation, $P(T_i/W_c)$ is the probability of misrepresenting the candidate string of words $W_c$ as the input string of words $T_i = W_i$.

The probability $P(W_i/T_i)$ that the original sentence was actually intended given that the original sentence was typed (that is, the probability of correctly spelling all of the words in the original sentence $W_i$) is compared to $P(W_c/T_i)$. For simplicity, both sides of the comparison are multiplied by $P(T_i)$ so that the product $P(W_i)P(T_i/W_i)$ is compared with the product $P(W_c)P(T_i/W_c)$. The sentence with the higher probability is selected as the sentence which was actually intended.

In order to further simplify the comparison, it may be assumed that the probability $P(T_i/W_i)$ of correctly spelling all of the words in the original typed sentence is equal to 1.

The probabilities $P(W_i)$ of occurrence of the input string of words and $P(W_c)$ of occurrence of the candidate string of words may be approximated by the product of n-gram probabilities for all n-grams in each string. That is, the probability of a string of words may be approximated by the product of the conditional probabilities of each word in the string, given the occurrence of the n−1 words (or absence of words) preceding each word. For example, if n=3, each trigram probability may represent the probability of occurrence of the third word in the trigram, given the occurrence of the first two words in the trigram.

The conditional probabilities may be determined empirically by examining large bodies of text. For example, the conditional probability $f(W_z/W_xW_y)$ of word $W_z$ given the occurrence of the string $W_xW_y$ may be estimated from the equation $$f(W_z|W_xW_y) = \lambda_1 f_1(W_z|W_xW_y) + \lambda_2 f_2(W_z|W_y) + \lambda_3 f_3(W_z) + \lambda_4 f_4 \quad (2)$$

where $$f_1(W_z|W_xW_y) = \frac{n_{xyz}}{n_{xy}} \quad (3)$$

$$f_2(W_z|W_y) = \frac{n_{yz}}{n_y} \quad (4)$$

$$f_3(W_z) = \frac{n_z}{n} \quad (5)$$

$$f_4 = \frac{1}{n} \quad (6)$$

and $$\lambda_1 + \lambda_2 + \lambda_3 + \lambda_4 = 1 \quad (7)$$

In equations (3)–(6), the count $n_{xyz}$ is the number of occurrences of the trigram $W_xW_yW_x$ in a large body of training text. The count $n_{xy}$ is the number of occurrences of the bigram $W_xW_y$ in the training text. Similarly, $n_{yz}$ is the number of occurrences of the bigram $W_yW_z$ in the training text, $n_y$ is the number of occurrences of word $W_y$, $n_z$ is the number of occurrences of word $W_z$, and n is the total number of words in the training text. The values of the coefficients $\lambda_1$, $\lambda_2$, $\lambda_3$, and $\lambda_4$ in equations (2) and (7) may be estimated by the deleted interpolation method described in an article by Lalit R. Bahl et al entitled "A Maximum Likelihood Approach to Continuous Speech Recognition" (IEEE Transactions on Pattern Analysis and Machine Intelligence, Vol. PAMI-5, No. 2, March 1983, pages 179–190).

In the comparison of $P(W_i)P(T_i/W_i)$ with $P(W_c)P(T_i/W_c)$ the probability $P(T_i/W_c)$ may be approximated by the product of the probabilities of misrepresenting each word in the candidate sentence as the corresponding word in the original typed sentence. Where the original typed sentence and the candidate sentence differ by only one word $T_2=W_2$ in the original sentence and $W_2$ in the candidate sentence), the probability $P(T_i/W_c)$ can be estimated to be equal to the probability $P(T_2/W_2)$ of misspelling the second word as the first word.

The probability of misspelling any given word should be estimated to have a low value, for example 0.001. This value has been determined by experiment to yield satisfactory results. By increasing the probability of misspelling, the invention will find more misspellings; by decreasing the probability of misspelling, the invention will find fewer misspellings. When the word $W_1$ in the original typed sentence has M misspellings which result in correct dictionary entries, the probability of each misspelling becomes (0.001/M) in this example.

If the probability $P(T_i|W_i)$ of correctly spelling all of the words in the original typed sentence is not estimated as 1, it may be approximated by the product of the probabilities of correctly spelling each word in the original typed sentence. Where the original typed sentence and the candidate sentence differ by only one word, the probability $P(T_i|W_i)$ may be estimated as the probability $P(T_i|W_1)$ of correctly spelling the first word $T_1=W_1$.

Figure 4:
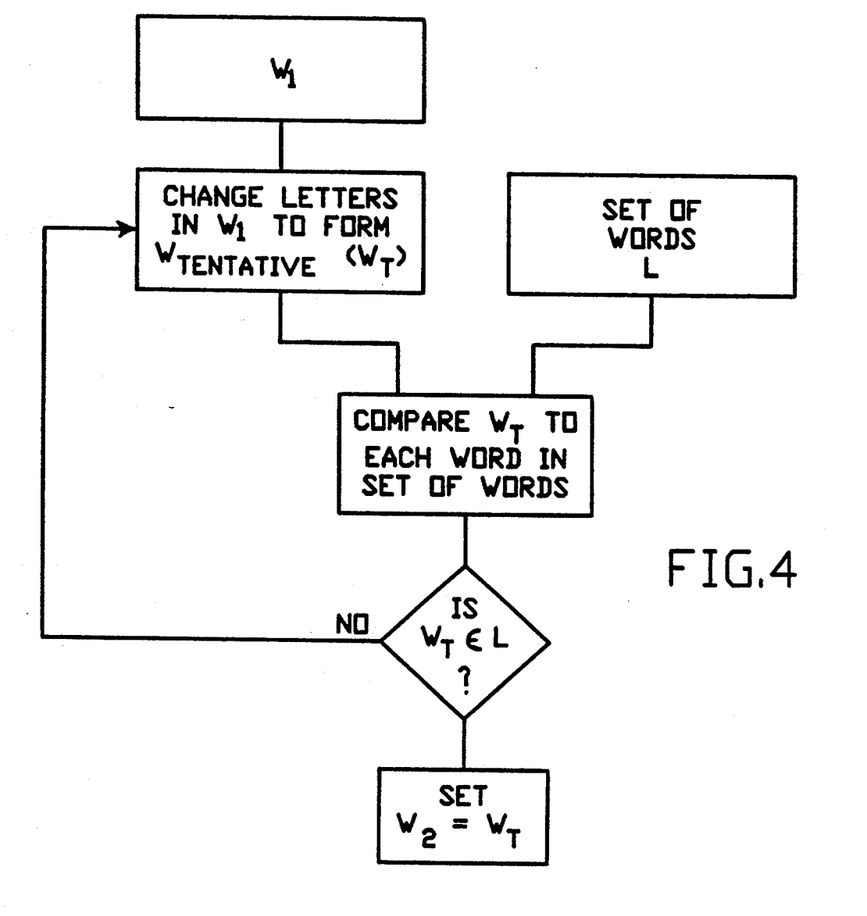
FIG. 4 is a block diagram of an embodiment of a routine for changing the spelling of a first word to form a second word in the spelling error detection and correction method according to the present invention.

FIG. 4 shows a subroutine which may be used to change the spelling of the first word $W_1$ to the second word $W_2$. First, one or more letters in the first word $W_1$ are changed to form a tentative word $W_T$. The changes may be made by, for example, adding a letter to the first word, deleting a letter from a first word, transposing two letters in the first word, or replacing a letter in a first word.

The tentative word $W_T$ is then compared to each word in a set of words (a spelling dictionary) L. If the tentative word $W_T$ matches a word in the spelling dictionary L, then the second word $W_2$ is set equal to the tentative word.

Figure 5:
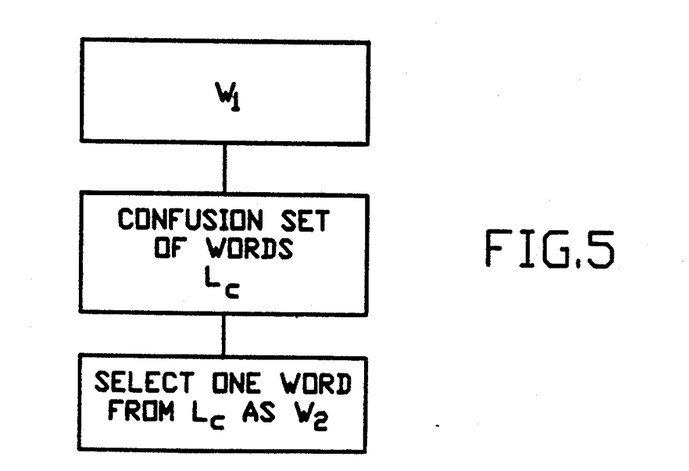
FIG. 5 is a block diagram of an alternative embodiment of a method of changing the spelling of a first word to form a second word.

FIG. 5 shows an alternative subroutine for changing the spelling of a word. In this routine, each word in the spelling dictionary is provided with an associated confusion group of words $L_c$ containing M different words. For example, each word in the confusion group may have a spelling which differs from the spelling of the first word $W_1$ by no more than two letters. Alternatively, each word in a confusion group may be a word which sounds like and is therefore confusable with the first word (for example, "to", "two", and "too", or "principle" and "principal"). For each candidate sentence, one word is selected from the confusion group $L_c$ as the second word $W_2$.

Figure 6:
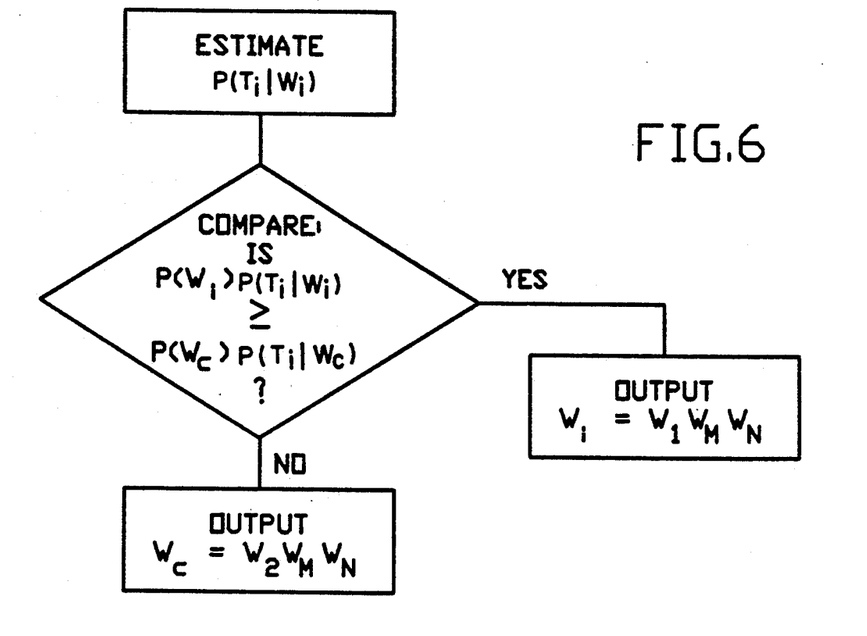
FIG. 6 is a block diagram of a preferred modification of the spelling error detection and correction method shown in FIG. 1.

FIG. 6 shows a modification of the spelling error detection and correction method of FIG. 1. The steps shows in FIG. 6 are intended to replace the steps in block 6 of FIG. 1.

According to the modification, the method further includes the step of estimating the probability $P(T_i|W_i)$ of correctly spelling all of the words in the input string of words $T_i=W_i$. The product of $P(W_i)P(T_i|W_i)$ is compared with the product $P(W_c)P(T_i|W_c)$. If the former is greater than or equal to the latter, a first output (for example, the input string) is produced. If the former is less than the latter, then a second output (for example, the candidate string) is produced.

Figure 7:
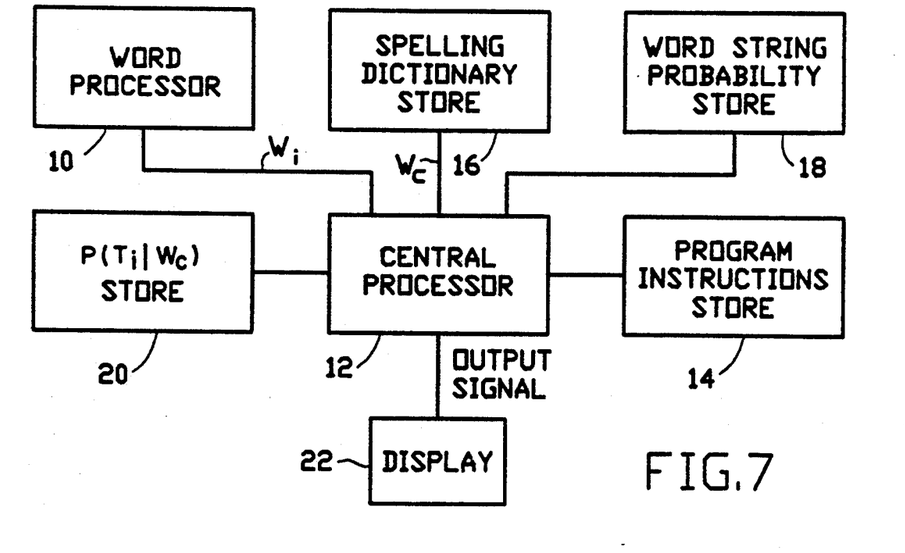
FIG. 7 is a block diagram of an embodiment of an apparatus for detecting and correcting an error in an information signal.

An apparatus for detecting and correcting an error in an information signal, for example where each information signal represents a word having a spelling, is preferably in the form of a programmed general purpose digital computer. FIG. 7 shows an example of the organization of such an apparatus.

As shown in FIG. 7, a word processor 10 provides an input string of information signals $T_i=W_i$. Each information signal represents information, such as a word. The word processor 10 is preferably a program running on a central processor 12 which is also executing the other functions of the apparatus. However, word processor 10 may alternatively be running on its own central processor.

Under the direction of the program instructions in program instructions store 14, the central processor 12 changes a first information signal $T_1=W_1$ in the input string $T_i=W_i$ to form a second information signal $W_2$ representing information which is different from the information represented by the first information signal. This change forms a candidate string of information signals $W_c$. Under the direction of the program instructions, central processor 12 compares the second information signal $W_2$ with the entries in the spelling dictionary store 16 to be sure that the second information signal is an entry in the spelling dictionary.

Having produced the input and candidate strings, central processor 12 is instructed to retrieve estimates of the probabilities of occurrence of the input and candidate strings from the word string probability store 18. The probability $P(T_i|W_c)$ of misrepresenting the information represented by the candidate string of information signals as the input string of information signals is retrieved from store 20. Finally, central processor 12 compares $P(W_i)$ with the product $P(W_c)P(T_i|W_c)$. A first output signal is sent to, for example, a display 22 if the former is greater than or equal to the latter. Otherwise, a second output signal is sent to the display 22.

$W_2$ is "a", and the candidate word string $W_c$ (the candidate sentence) is "a submit that is what is happening in this case."

Table 1 shows the input and candidate sentences, the trigrams which make up each sentence, and the natural logarithms of the conditional probabilities for each trigram. The experiment was performed with four different values of the probability $P_t$ of correctly spelling each word: $P_t=0.9999$, $P_t=0.999$, $P_t=0.99$, or $P_t=0.9$.

Since the logarithms (base e) of the probabilities are estimated in Table 1, the logarithms are added to produce estimates of the product of the probabilities.

Table 2 shows the totals obtained from Table 1. For all values of $P_t$, the original sentence $W_i$ is selected over the alternative candidate sentence $W_c$.

TABLE 1

| Input Word String ($T_i = W_i$) | Trigrams | Trigram Logarithm Probability | COMPONENTS OF lnP(Ti/Wi) | | | |
|---|---|---|---|---|---|---|
| | | | for Pt = 0.9999 | for Pt = 0.999 | for Pt = 0.99 | for Pt = 0.9 |
| I | _ _ I | −3.47634 | −0.00010 | −0.00100 | −0.01005 | −0.10536 |
| submit | _ I submit | −8.47750 | −0.00010 | −0.00100 | −0.01005 | −0.10536 |
| that | I submit that | −1.23049 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | lnP(Wi) = | −39.05735 | | | | |
| | lnp(Ti/Wi) = | | −0.0011 | −0.0110 | −0.1106 | −1.1590 |

| Candidate Word String (Wc) | Trigrams | Trigram Logarithm Probability | COMPONENTS OF lnP(Ti/Wc) | | | |
|---|---|---|---|---|---|---|
| | | | for Pt = 0.9999 | for Pt = 0.999 | for Pt = 0.99 | for Pt = 0.9 |
| a | _ _ a | −3.96812 | −9.21034 | −6.90776 | −4.60517 | −2.30259 |
| submit | _ a submit | −10.20667 | −0.00010 | −0.00100 | −0.01005 | −0.10536 |
| that | a submit that | −3.69384 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | lnP(Wc) = | −43.74165 | | | | |
| | lnp(Ti/Wc) = | | −9.2113 | −6.9178 | −4.7057 | −3.3562 |

The spelling error detection and correction method and apparatus according to the present invention were tested on 3,044 sentences which were systematically misspelled from 48 sentences. The 48 sentences were chosen from the Associated Press News Wire and from the Proceedings of the Canadian Parliament. Trigram conditional probabilities were obtained from a large corpus of text consisting primarily of office correspondence. Using a probability $P(T_i|W_i)$ of 0.999, the method selected the changed sentence 78% of the time. Of those sentences that were changed, they were changed correctly 97% of the time.

Several examples selected from the above-described tests are described below.

EXAMPLE I

In this example, the input word string (the original typed sentence) is "I submit that is what is happening in this case." The word $W_1$ whose spelling is being checked is "I". The word "I" has only the following simple misspelling: "a". Therefore, the second word

TABLE 2

| Pt | ln[P(Wi)P(Ti/Wi)] | ln[P(Wc)P(Ti/Wc)] |
|---|---|---|
| 0.99990 | −39.05845 | −52.95299 |
| 0.99900 | −39.06836 | −50.65941 |
| 0.99000 | −39.16790 | −48.44732 |
| 0.90000 | −40.21632 | −47.09784 |

EXAMPLE II

In this example, the input word string $T_i=W_i$ is: "I submit that is what is happening in this case". The first word $T_1=W_1$ whose spelling is being checked is "submit". The word "submit" has two simple misspellings: "summit" or "submits". In this example, the second word $W_2$ is selected to be "summit". Therefore, the candidate word string $W_c$ (the candidate sentence) is "I summit that is what is happening in this case."

Table 3 shows the logarithms of the probabilities, and Table 4 provides the totals for Table 3. Again, for each value of $P_t$, the original sentence is selected over the candidate.

TABLE 3

| Input Word String ($T_i = W_i$) | Trigrams | Logarithm Trigram Probability | COMPONENTS OF lnP(Ti/Wi) | | | |
|---|---|---|---|---|---|---|
| | | | for $P_t = 0.9999$ | for $P_t = 0.999$ | for $P_t = 0.99$ | for $P_t = 0.9$ |
| I | _ _ I | −3.47634 | −0.00010 | −0.00100 | −0.01005 | −0.10536 |
| submit | _ I submit | −8.47750 | −0.00010 | −0.00100 | −0.01005 | −0.10536 |
| that | I submit that | −1.23049 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | lnP(Wi) = | −39.05735 | | | | |
| | lnp(Ti/Wi) = | | −0.0011 | −0.0110 | −0.1106 | −1.1590 |

| Candidate Word String (Wc) | Trigrams | Logarithm Trigram Probability | COMPONENTS OF lnP(Ti/Wc) | | | |
|---|---|---|---|---|---|---|
| | | | for $P_t = 0.9999$ | for $P_t = 0.999$ | for $P_t = 0.99$ | for $P_t = 0.9$ |
| I | _ _ I | −3.47634 | −0.00010 | −0.0010 | −0.01005 | −0.10536 |
| submit | _ I submit | −18.48245 | −9.90349 | −7.60090 | −5.29832 | −2.99573 |
| that | I submit that | −5.49443 | −0.00010 | −0.00100 | −0.0.1005 | −0.10536 |
| is | submit that is | −3.50595 | −0.00010 | −0.00100 | −0.0.1005 | −0.10536 |
| what | that is what | −3.04882 | −0.00010 | −0.00100 | −0.0.1005 | −0.10536 |
| is | is what is | −3.07193 | −0.00010 | −0.00100 | −0.0.1005 | −0.10536 |
| happening | what is happening | −4.88977 | −0.00010 | −0.00100 | −0.0.1005 | −0.10536 |
| in | is happening in | −1.72564 | −0.00010 | −0.00100 | −0.0.1005 | −0.10536 |
| this | happening in this | −3.84228 | −0.00010 | −0.00100 | −0.0.1005 | −0.10536 |
| case | in this case | −2.49284 | −0.00010 | −0.00100 | −0.0.1005 | −0.10536 |
| . | this case. | −2.05863 | −0.00010 | −0.00100 | −0.0.1005 | −0.10536 |
| | lnP(Wc) = | −52.08908 | | | | |
| | lnp(Ti/Wc) = | | −9.9045 | −7.6109 | −5.3988 | −4.0493 |

TABLE 4

| Pt | ln[P(Wi)P(Ti/Wi)] | ln[P(Wc)P(Ti/Wc)] |
|---|---|---|
| 0.99990 | −39.05845 | −61.99357 |
| 0.99900 | −39.06836 | −59.69999 |
| 0.99000 | −39.16790 | −57.48790 |
| 0.90000 | −40.21632 | −56.13842 |

EXAMPLE III

In this example, the input word string $T_i = W_i$ (the original typed sentence) is now "a submit that is what is happening in this case." The first word $T_1 = W_1$ whose spelling is being checked is "a". The word "a" has the following ten simple misspellings: "I", "at", "as", "an", "am", "ad", "ab", "pa", "or", "ha".

A second word $W_2$ is selected to be "I". Therefore, the candidate string is "I submit that is what is happening in this case."

The logarithms of the individual probabilities are shown in Table 5. Note that the probability $P(T_1|W_2)$ is equal to $(P_t/M)$ (where M equals 10.)

Table 6 provides the totals from Table 5. For all values of $P_t$, except $P_t = 0.9$, the original sentence is selected over the candidate. When $P_t = 0.9$, the candidate is selected over the original.

TABLE 5

| Input Word String ($T_i = W_i$) | Trigrams | Logarithm Trigram Probability | COMPONENTS OF lnP(Ti/Wi) | | | |
|---|---|---|---|---|---|---|
| | | | for $P_t = 0.9999$ | for $P_t = 0.999$ | for $P_t = 0.99$ | for $P_t = 0.9$ |
| a | _ _ a | −3.96812 | −0.00010 | −0.00100 | −0.01005 | −0.10536 |
| submit | _ a submit | −10.20667 | −0.00010 | −0.00100 | −0.01005 | −0.10536 |
| that | a submit that | −3.69384 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | lnP(Wi) = | −43.74165 | | | | |
| | lnp(Ti/Wi) = | | −0.0011 | −0.0110 | −0.1106 | −1.1590 |

| Candidate Word String (Wc) | Trigrams | Logarithm Trigram Probability | COMPONENTS OF lnP(Ti/Wc) | | | |
|---|---|---|---|---|---|---|
| | | | for $P_t = 0.9999$ | for $P_t = 0.999$ | for $P_t = 0.99$ | for $P_t = 0.9$ |
| I | _ _ I | −3.47634 | −11.51293 | −9.21034 | −6.90776 | −4.60517 |
| submit | _ I submit | −8.47750 | −0.00010 | −0.00100 | −0.01005 | −0.10536 |

TABLE 5-continued

| | | | | | | |
|---|---|---|---|---|---|---|
| that | I submit that | −1.23049 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | $\ln P(W_c) =$ | −39.05735 | | | | |
| | $\ln p(T_i/W_c) =$ | | −11.5139 | −9.2203 | −7.0083 | −5.6588 |

TABLE 6

| $P_t$ | $\ln[P(W_i)P(T_i/W_i)]$ | $\ln[P(W_c)P(T_i/W_c)]$ |
|---|---|---|
| 0.99990 | −43.74275 | −50.57128 |
| 0.99900 | −43.75266 | −48.27770 |
| 0.99000 | −43.85220 | −46.06561 |
| 0.90000 | −44.90062 | −44.71613 |

EXAMPLE IV

In this example, the input word string $T_i = W_i$ is "I summit that is what is happening in this case." The first word $T_1 = W_1$ whose spelling is being checked is "summit". The word "summit" has two simple misspellings: "submit" or "summit".

The second word $W_2$ is selected to be "submit". Therefore, the candidate word string $W_c$ is "I submit that is what is happening in this case."

Table 7 shows the logarithms of the estimated probabilities of the trigrams and of correctly spelling or incorrectly spelling each word. Since M=2, the probability $P(T_1|W_2) = (P_t/2)$.

Table 8 provides the totals from Table 7. For all values of $P_t$, the candidate sentence is selected over the original typed sentence. A correction is therefore made in all cases.

TABLE 7

| Input Word String ($T_i = W_i$) | Trigrams | Trigram Logarithm Probs. | COMPONENTS OF $\ln P(T_i/W_i)$ | | | |
|---|---|---|---|---|---|---|
| | | | for $P_t = 0.9999$ | for $P_t = 0.999$ | for $P_t = 0.99$ | for $P_t = 0.9$ |
| I | _ _ I | −3.47634 | −0.00010 | −0.00100 | −0.01005 | −0.10536 |
| submit | _ I submit | −18.48245 | −0.00010 | −0.00100 | −0.01005 | −0.10536 |
| that | I submit that | −5.49443 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | $\ln P(W_i) =$ | −52.08908 | | | | |
| | $\ln p(T_i/W_i) =$ | | −0.0011 | −0.0110 | −0.1106 | −1.1590 |
| Candidate Word String ($W_c$) | Trigrams | Logarithm Trigram Probability | COMPONENTS OF $\ln P(T_i/W_c)$ | | | |
| | | | for $P_t = 0.9999$ | for $P_t = 0.999$ | for $P_t = 0.99$ | for $P_t = 0.9$ |
| I | _ _ I | −3.47634 | −11.51293 | −9.21034 | −6.90776 | −4.60517 |
| submit | _ I submit | −8.47750 | −0.00010 | −0.00100 | −0.01005 | −0.10536 |
| that | I submit that | −1.23049 | −0.00010 | −0.00100 | −0.01005 | −0.10536 |
| is | submit that is | −4.74311 | −0.00010 | −0.00100 | −0.01005 | −0.10536 |
| what | that is what | −3.04882 | −0.00010 | −0.00100 | −0.01005 | −0.10536 |
| is | is what is | −3.07193 | −0.00010 | −0.00100 | −0.01005 | −0.10536 |
| happening | what is happening | −4.88977 | −0.00010 | −0.00100 | −0.01005 | −0.10536 |
| in | is happening in | −1.72564 | −0.00010 | −0.00100 | −0.01005 | −0.10536 |
| this | happening in this | −3.84228 | −0.00010 | −0.00100 | −0.01005 | −0.10536 |
| case | in this case | −2.49284 | −0.00010 | −0.00100 | −0.01005 | −0.10536 |
| . | this case. | −2.05863 | −0.00010 | −0.00100 | −0.01005 | −0.10536 |
| | $\ln P(W_c) =$ | −39.05735 | | | | |
| | $\ln p(T_i/W_c) =$ | | −9.9045 | −7.6109 | −5.3988 | −4.0493 |

TABLE 8

| $P_t$ | $\ln[P(W_i)P(T_i/W_i)]$ | $\ln[P(W_c)P(T_i/W_c)]$ |
|---|---|---|
| 0.99990 | −52.09018 | −48.96184 |
| 0.99900 | −52.10009 | −46.66826 |
| 0.99000 | −52.19963 | −44.45617 |
| 0.90000 | −53.24805 | −43.10669 |

We claim:

1. A spelling error detection method, said method comprising the steps of:
   providing an input string of words $T_i = W_i$ produced by a word processor, each word having a spelling;
   changing the spelling of a first word $T_1 = W_1$ in the input string to form a second word $W_2$ different from the first word;
   replacing the first word $W_1$ in the input string $W_i$ with the second word $W_2$ to form a candidate string of words $W_c$;
   estimating the probability $P(W_i)$ of occurrence of the input string of words;

estimating the probability $P(W_c)$ of occurrence of the candidate string of words;

estimating the probability $P(T_i|W_c)$ of misrepresenting the candidate string of words $W_c$ as the input string of words $T_i$;

comparing $P(W_i)$ with the product $P(W_c)P(T_i|W_c)$; and outputting the input string of words if $P(W_i)$ is greater than $P(W_c)P(T_i|W_c)$, or outputting an error indication if $P(W_i)$ is less than $P(W_c)P(T_i|W_c)$.

2. A method as claimed in claim 1, characterized in that:

the second output comprises the candidate string of words; and the probability $P(T_i|W_c)$ is estimated as the probability $P(T_1|W_2)$ of misspelling the second word $W_2$ as the first word $T_1$.

3. A method as claimed in claim 2, characterized in that:

the method further comprises the step of providing a set of words, each word having a spelling;

each word in the input string of words is a member of the set of words; and the second word $W_2$ is a member of the set of words.

4. A method as claimed in claim 3, characterized in that:

the method further comprises the step of estimating the probability $P(T_i|W_i)$ of correctly spelling all of the words in the input string of words $W_i$;

the step of comparing comprises comparing the product $P(W_i)P(T_i|W_i)$ with the product; and the step of outputting comprises outputting the first output if $P(W_i)P(T_i|W_i)$ is greater than, or outputting the second output if $P(W_i)P(T_i|W_i)$ is less than $P(W_c)P(T_i|W_c)$.

5. A method as claimed in claim 4, characterized in that the probability $P(T_i|W_i)$ is estimated as the probability $P(T_1|W_1)$ of correctly spelling the first word $T_1$.

6. A method as claimed in claim 5, characterized in that the step of changing the spelling of the first word $W_1$ to form the second word $W_2$ comprises:

adding a letter to the first word to form a tentative word;

comparing the tentative word to each word in the set of words; and using the tentative word as the second word $W_2$ if the tentative word matches a word in the set of words.

7. A method as claimed in claim 5, characterized in that the step of changing the spelling of the first word $W_1$ to form the second word $W_2$ comprises:

deleting a letter from the first word to form a tentative word;

comparing the tentative word to each word in the set of words; and using the tentative word as the second word $W_2$ if the tentative word matches a word in the set of words.

8. A method as claimed in claim 5, characterized in that:

the first word comprises at least two letters; and the step of changing the spelling of the first word $W_1$ to form the second word $W_2$ comprises:

transposing at least two letters in the first word to form a tentative word;

comparing the tentative word to each word in the set of words; and using the tentative word as the second word $W_2$ if the tentative word matches a word in the set of words.

9. A method as claimed in claim 5, characterized in that:

the first word comprises at least one letter; and the step of changing the spelling of the first word $W_1$ to form the second word $W_2$ comprises:

replacing a letter in the first word with a different letter to form a tentative word;

comparing the tentative word to each word in the set of words; and using the tentative word as the second word $W_2$ if the tentative word matches a word in the set of words.

10. A method as claimed in claim 5, characterized in that the step of changing the spelling of the first word $W_1$ to form the second word $W_2$ comprises:

identifying a confusion group of M different words in the set of words, each word in the confusion group having a spelling which differs from the spelling of the first word by no more than two letters; and selecting one word in the confusion group as the second word $W_2$.

11. A method as claimed in claim 5, characterized in that the step of changing the spelling of the first word $W_1$ to form the second word $W_2$ comprises:

identifying a confusion group of M different words in the set of words, each word in the confusion group being confusable with the first word; and selecting one word in the confusion group as the second word $W_2$.

12. A method as claimed in claim 11, characterized in that:

the probability $P(T_1|W_1)$ is estimated to be 0.999; and the probability $P(T_i|W_c)$ is estimated to be $(0.001/M)$.

13. A method of detecting an error in an information signal, said method comprising the steps of:

providing an input string of information signals $T_i = W_i$, each information signal representing information;

changing a first information signal $T_1 = W_1$ in the input string to form a second information signal $W_2$ representing information different from the information represented by the first information signal;

replacing the first information signal $W_1$ in the input string $W_i$ with the second information signal $W_2$ to form a candidate string of information signals $W_c$;

estimating the probability $P(W_i)$ of occurrence of the input string of information signals;

estimating the probability $P(W_c)$ of occurrence of the candidate string of information signals;

estimating the probability $P(T_i|W_c)$ of misrepresenting the information represented by the candidate string of information signals $W_c$ as the input string of information signals $T_i$;

comparing $P(W_i)$ with the product $P(W_c)P(T_i|W_c)$; and outputting the input string of information signals if $P(W_i)$ is greater than $P(W_c)P(T_i|W_c)$, or outputting an error indication signal if $P(W_i)$ is less than $P(W_c)P(T_i|W_c)$.

14. A method as claimed in claim 13, characterized in that:

the second output signal comprises the candidate string of information signals; and the probability $P(T_i|W_c)$ is estimated as the probability $P(T_1|W_2)$ of misrepresenting the information represented by the second information signal $W_2$ as the first information signal $T_1$.

15. A method as claimed in claim 14, characterized in that:
- the method further comprises the step of providing a set of words, each word having a spelling;
- each information signal in the input string of information signals represents a word which is a member of the set of words; and
- the second information signal $W_2$ represents a word which is a member of the set of words, the word represented by the second information signal being different from the word being represented by the first information signal.

16. A method as claimed in claim 15, characterized in that:
- the method further comprises the step of estimating the probability $P(T_i|W_i)$ of correctly representing the information represented by all of the information signals in the input string of information signals $W_i$;
- the step of comparing comprises comparing the product $P(W_i)P(T_i|W_i)$ with the product $P(W_c)P(T_i|W_c)$; and
- the step of outputting comprises outputting the first output signal if $P(W_i)P(T_i|W_i)$ is greater than $P(W_c)P(T_i|W_c)$, or outputting the second output signal if $P(W_i)P(T_i|W_i)$ is less than $P(W_c)P(T_i|W_c)$.

17. A method as claimed in claim 16, characterized in that: the probability $P(T_i|W_i)$ is estimated as the probability $P(T_1|W_1)$ of correctly representing the information represented by the first information signal $T_1$.

18. A method as claimed in claim 17, characterized in that the step of changing the first information signal $W_1$ to form the second information signal $W_2$ comprises:
- adding a letter to the word represented by the first information signal to form a tentative word;
- comparing the tentative word to each word in the set of words; and
- representing the tentative word as the second information signal $W_2$ if the tentative word matches a word in the set of words.

19. A method as claimed in claim 17, characterized in that the step of changing the first information signal $W_1$ to form the second information signal $W_2$ comprises:
- deleting a letter from the word represented by the first information signal to form a tentative word;
- comparing the tentative word to each word in the set of words; and
- representing the tentative word as the second information signal $W_2$ if the tentative word matches a word in the set of words.

20. A method as claimed in claim 17, characterized in that:
- the first information signal represents a word having at least two letters; and
- the step of changing the first information signal $W_1$ to form the second information signal $W_2$ comprises:
- transposing at least two letters in the word represented by the first information signal to form a tentative word;
- comparing the tentative word to each word in the set of words; and
- representing the tentative word as the second information signal $W_2$ if the tentative word matches a word in the set of words.

21. A method as claimed in claim 17, characterized in that:
- the first information signal represents a word having at least one letter; and
- the step of changing the first information signal $W_1$ to form the second information signal $W_2$ comprises:
- replacing a letter in the word represented by the first information signal to form a tentative word;
- comparing the tentative word to each word in the set of words; and
- representing the tentative word as the second information signal $W_2$ if the tentative word matches a word in the set of words.

22. A method as claimed in claim 17, characterized in that the step of changing the first information signal $W_1$ to form the second information signal $W_2$ comprises:
- identifying a confusion group of M different words in the set of words, each word in the confusion group having a spelling which differs from the spelling of the word represented by the first information signal by no more than two letters; and
- representing one word in the confusion group as the second information signal $W_2$.

23. A method as claimed in claim 17, characterized in that the step of changing the first information signal $W_1$ to form the second information signal $W_2$ comprises:
- identifying a confusion group of M different words in the set of words, each word in the confusion group being confusable with the word represented by the first information signal; and
- representing one word in the confusion group as the second information signal $W_2$.

24. A method as claimed in claim 23, characterized in that:
- the probability $P(T_1|W_1)$ is estimated to be 0.999; and
- the probability $P(T_i|W_c)$ is estimated to be $(0.001/M)$.

25. An apparatus for detecting an error in an information signal, said apparatus comprising:
- means for providing an input string of information signals $T_i=W_i$, each information signal representing information;
- means for changing a first information signal $T_1=W_1$ in the input string to form a second information signal $W_2$ representing information different from the information represented by the first information signal;
- means for replacing the first information signal $W_1$ in the input string with the second information signal $W_2$ to form a candidate string of information signals $W_c$;
- means for estimating the probability $P(W_i)$ of occurrence of the input string of information signals;
- means for estimating the probability $P(W_c)$ of occurrence of the candidate string of information signals;
- means for estimating the probability $P(T_i|W_c)$ of misrepresenting the information represented by the candidate string of information signals $W_c$ as the input string of information signals $T_i$;
- means for comparing $P(W_i)$ with the product $P(W_c)P(T_i|W_c)$; and
- means for outputting the input string of information signals if $P(W_i)$ is greater than $P(W_c)P(T_i|W_c)$, or outputting an error indication signal if $P(W_i)$ is less than $P(W_c)P(T_i|W_c)$.

26. An apparatus as claimed in claim 25, characterized in that:
- the second output signal comprises the candidate string of information signals; and the probability $P(T_i|W_c)$ is estimated as the probability $P(T_1|W_2)$ of misrepresenting the information represented by the second information signal $W_2$ as the first information signal $T_1$.

27. An apparatus as claimed in claim 26, characterized in that:
the apparatus further comprises dictionary means for storing a set of words, each word having a spelling;
each information signal in the input string of information signals represents a word which is a member of the set of words; and
the second information signal $W_2$ represents a word which is a member of the set of words, the word represented by the second information signal being different from the word being represented by the first information signal.

28. An apparatus as claimed in claim 27, characterized in that:
the apparatus further comprises means for estimating the probability $P(T_i|W_i)$ of correctly representing all of the information represented by the input string of information signals $W_i$;
the means for comparing comprises means for comparing the product $P(W_i)P(T_i|W_i)$ with the product $P(W_c)P(T_i|W_c)$; and
the means for outputting comprises means for outputting the first output signal if $P(W_i)P(T_i|W_i)$ is greater than $P(W_c)P(T_i|W_c)$, or outputting the second output signal if $P(W_i)P(T_i|W_i)$ is less than $P(W_c)P(T_i|W_c)$.

29. An apparatus as claimed in claim 28, characterized in that: the probability $P(T_i|W_i)$ is estimated as the probability $P(T_1|W_1)$ of correctly representing the information represented by the first information signal $W_1$.

30. An apparatus as claimed in claim 29, characterized in that the means for changing the first information signal $W_1$ to form the second information signal $W_2$ comprises:
means for adding a letter to the word represented by the first information signal to form a tentative word;
means for comparing the tentative word to each word in the set of words; and
means for representing the tentative word as the second information signal $W_2$ if the tentative word matches a word in the set of words.

31. An apparatus as claimed in claim 29, characterized in that the means for changing the first information signal $W_1$ to form the second information signal $W_2$ comprises:
means for deleting a letter from the word represented by the first information signal to form a tentative word;
means for comparing the tentative word to each word in the set of words; and
means for representing the tentative word as the second information signal $W_2$ if the tentative word matches a word in the set of words.

32. An apparatus as claimed in claim 27, characterized in that
the first information signal represents a word having at least two letters; and
the means for changing the first information signal $W_1$ to form the second information signal $W_2$ comprises:
means for transporting at least two letters in the word represented by the first information signal to form a tentative word;
means for comparing the tentative word to each word in the set of words; and
means for representing the tentative word as the second information signal $W_2$ if the tentative word matches a word in the set of words.

33. An apparatus as claimed in claim 29, characterized in that:
the first information signal represents a word having at least one letter; and
the means for changing the first information signal $W_1$ to form the second information signal $W_2$ comprises:
means for replacing a letter in the word represented by the first information signal to form a tentative word;
means for comparing the tentative word to each word in the set of words; and
means for representing the tentative word as the second information signal $W_2$ if the tentative word matches a word in the set of words.

34. An apparatus as claimed in claim 29, characterized in that the means for changing the first information signal $W_1$ to form the second information signal $W_2$ comprises:
means for identifying a confusion group of M different words in the set of words, each word in the confusion group having a spelling which differs from the spelling of the word represented by the first information signal by no more than two letters; and
means for representing one word in the confusion group as the second information signal $W_2$.

35. An apparatus as claimed in claim 29, characterized in that the means for changing the first information signal $W_1$ to form the second information signal $W_2$ comprises:
means for identifying a confusion group of M different words in the set of words, each word in the confusion group being confusable with the word represented by the first information signal; and
means for representing one word in the confusion group as the second information signal $W_2$.

36. A method as claimed in claim 35, characterized in that:
the probability $P(T_1|W_1)$ is estimated to be 0.999; and
the probability $P(T_i|W_c)$ is estimated to be (0.001/M).

* * * * *